US009215405B2

(12) United States Patent
Atkinson (10) Patent No.: US 9,215,405 B2
(45) Date of Patent: *Dec. 15, 2015

(54) MODIFICATION OF IMAGES BASED ON ORIENTATION (75) Inventor: Lee Warren Atkinson, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/351,263

(22) PCT Filed: Dec. 9, 2011

(86) PCT No.: PCT/US2011/064249
§ 371 (c)(1),
(2), (4) Date: Apr. 11, 2014

(87) PCT Pub. No.: WO2013/085546
PCT Pub. Date: Jun. 13, 2013

(65) Prior Publication Data
US 2014/0267541 A1    Sep. 18, 2014

(51) Int. Cl.
H04N 7/14         (2006.01)
H04N 21/4223      (2011.01)
H04N 21/44        (2011.01)
H04N 21/4402      (2011.01)
H04N 21/4788      (2011.01)

(52) U.S. Cl.
CPC .......... *H04N 7/141* (2013.01); *H04N 21/4223* (2013.01); *H04N 21/4402* (2013.01); *H04N 21/44008* (2013.01); *H04N 21/440263* (2013.01); *H04N 21/4788* (2013.01)

(58) Field of Classification Search
CPC ...................................................... H04N 7/14
USPC ....................... 348/14.01, 14.02, 14.07, 14.12
See application file for complete search history.

(56) References Cited

U.S. PATENT DOCUMENTS

| | | | | |
|---|---|---|---|---|
| 5,900,909 A | * | 5/1999 | Parulski | H04N 1/2112 348/231.6 |
| 6,011,585 A | | 1/2000 | Anderson | |
| 6,262,769 B1 | * | 7/2001 | Anderson et al. | 348/333.1 |
| 7,148,911 B1 | * | 12/2006 | Mitsui et al. | 348/14.01 |
| 7,706,579 B2 | | 4/2010 | Oijer | |
| 8,542,265 B1 | * | 9/2013 | Dodd et al. | 348/14.08 |
| 2001/0008412 A1 | * | 7/2001 | Ando et al. | 348/14.02 |
| 2007/0296820 A1 | * | 12/2007 | Lonn | 348/207.99 |
| 2008/0152199 A1 | | 6/2008 | Oijer | |
| 2008/0291221 A1 | | 11/2008 | Yamada et al. | |
| 2010/0149398 A1 | | 6/2010 | Gayer | |
| 2011/0193982 A1 | | 8/2011 | Kook et al. | |
| 2011/0249073 A1 | * | 10/2011 | Cranfill et al. | 348/14.02 |
| 2012/0086819 A1 | * | 4/2012 | Wilson et al. | 348/207.1 |
| 2013/0222516 A1 | * | 8/2013 | DO et al. | 348/14.01 |

FOREIGN PATENT DOCUMENTS

EP       2280331 A1    2/2011

* cited by examiner

*Primary Examiner* — Olisa Anwah
(74) *Attorney, Agent, or Firm* — HP Legal Department (57) ABSTRACT An image sensor can have a first orientation. If the first orientation differs from a second orientation, values can be read from the image sensor in a manner so as to generate image data having the second orientation.

20 Claims, 9 Drawing Sheets

MODIFICATION OF IMAGES BASED ON ORIENTATION

BACKGROUND

With the popularity of computing devices, digital communication is becoming common. Some devices, such as smart phones, have cameras that allow a user to conduct video calls with other users. Manufacturers of these devices are challenged with enabling consumer-friendly usage of these devices. For example, enabling devices to perform hassle-free video conferencing irrespective of user actions may be desired.

BRIEF DESCRIPTION OF DRAWINGS

The following detailed description refers to the drawings, wherein.

DETAILED DESCRIPTION

Manufacturers of computing devices, such as smart phones, tablet and slate computers, laptop computers, and the like, are challenged with enabling consumer friendly usage of these devices. Furthermore, as digital communication, such as video calling, is becoming more common, users are coming to expect hassle-free communication using their computing devices. As described in detail below, various example embodiments relate to image transfer techniques that enable easy, hassle-free communication between devices.

For example, during a video call, two communication devices with cameras may be oriented in portrait mode. If one of the users subsequently orients his communication device to landscape mode, a complication can arise because the camera of that device is then also oriented in landscape mode. As a result, an image transferred to the other device may in turn be oriented in landscape mode. If the situation is left undetected, when the receiving device, which is still in portrait orientation, displays the image, the image may appear sideways relative to the user of the receiving device, resulting in a poor user experience.

According to an example embodiment, however, the sending device can detect that the camera is in an unexpected orientation and can generate an image according to the expected orientation even though the camera is in an unexpected orientation. Furthermore, the sending device can generate the image so that the image has an aspect ratio expected by the receiving device. As a result, the receiving device can receive an image in an expected orientation with an expected aspect ratio even despite a change of orientation and aspect ratio by the sending device.

There may be many advantages to such an embodiment. For instance, as a preliminary matter, correctly oriented images may be provided to a receiving device despite changes in orientation by the sending device. This can result in a smooth, fluid, user-friendly video call between users of similar or disparate communication devices. Second, due to the change in aspect ratio, more of the screen real estate of the second device may be used during the video conversation, as opposed to displaying the entire landscape oriented image in a smaller display area of the portrait-oriented receiving device, for example. Moreover, these benefits can be achieved even if the receiving device does not have the graphic processing capability to evaluate incoming image data and alter it so that the underlying image is displayed in a suitable fashion.

Other benefits relate to a reduction in data needed to be sent to the receiving device. For example, image orientation information need not be sent along with every image since the sent images may be already oriented according to the orientation expected by the receiving device. Additionally, the amount of image data transferred to the receiving device may be reduced due to the change in aspect ratio (and, concomitantly, change in resolution) on the sending side. Further details of this embodiment and associated advantages, as well as of other embodiments and applications, will be discussed in more detail below with reference to the drawings.

Figure 1:
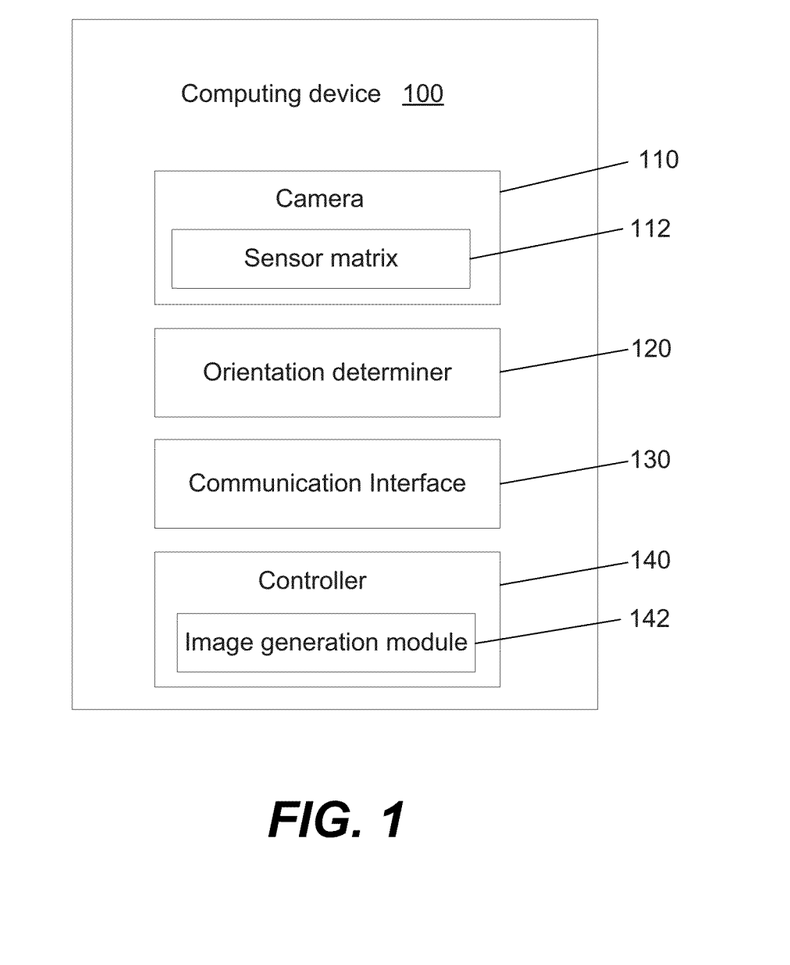
FIG. 1 is a block diagram illustrating a computing device including a camera and a controller to generate image data, according to an example.

Referring now to the drawings, FIG. 1 is a block diagram illustrating an embodiment of a computing device 100 including a camera 110, an orientation determiner 120, a communication interface 130, and a controller 140. Computing device 100 may be any of a variety of computing devices. For example, computing device 100 may be a cellular telephone, a smart phone, a tablet or slate computer, a laptop computer, or a desktop computer, among others.

Computing device 100 may include a camera. Camera 110 may be a digital camera integrated into computing device 100, attached thereto, or integrated into or attached to a monitor associated with computing device 100. Camera 110 may be or include an image sensor. For example, the image sensor may be a charge coupled device (CCD) image sensor or a complementary metal oxide semiconductor (CMOS) image sensor.

Camera 110 (or the image sensor) may include a sensor matrix 112. Sensor matrix 112 may include multiple sensor elements for sensing an image. These sensor elements may be photodetectors/photosensors, which can detect/sense light and convert the light to an electrical signal. The sensor elements can be arranged in matrix formation and may constitute a photoactive region of the camera. The value in each sensor element may represent a pixel in an ultimate image. An example sensor matrix is described in more detail below with reference to FIGS. 2 and 3.

Camera 110 may be used for snapping still images or for capturing video image frames. Camera 110 may include a processor, such as a digital signal processor, but may also be controlled by a separate processor in computing device 100 (e.g., controller 140).

Orientation determiner 120 may include a sensor configured to sense an orientation of computing device 100, of camera 110, and/or of a display associated with computing device 100. For example, orientation determiner 120 may include an accelerometer. A current reading or value from the accelerometer may be used to determine orientation. Such orientation could then be used to imply the orientation of an image sensed by camera 110. Other sensors suitable for detecting orientation may also be used.

Alternatively, or in addition to such a sensor, orientation determiner 120 may include logic, such as machine-readable instructions, for detecting and recognizing objects in an image represented by image data, and determining the orientation of the objects. Thus, for example, facial recognition techniques may be used to infer the orientation of an image sensed by camera 110. The orientation of the image may be indicative of the orientation of the camera 110. Determining orientation in this manner, though, may involve some preprocessing of the image sensed by camera 110.

Orientation determiner may be implemented using controller 140, using a digital signal processor of camera 110, or using another processor, in combination with instructions stored in memory.

Images or video image frames (referred to below as "images") generated by camera 110 may be transmitted to another computing device via communication interface 130. Communication interface 130 may include, for example, a transmitter that may convert electronic signals to radio frequency (RF) signals and/or a receiver that may convert RF signals to electronic signals. Alternatively, communication interface 130 may include a transceiver to perform functions of both the transmitter and receiver. Communication interface 130 may further include or connect to an antenna assembly to transmit and receive the RF signals over the air. Communication interface 130 may communicate with a network, such as a wireless network, a cellular network, a local area network, a wide area network, a telephone network, an intranet, the Internet, or a combination thereof. Additionally, communication interface 130 may include an Ethernet connection or other direct connection to a network.

Computing device 100 may include controller 140 having image generation module 142. In one example, image generation module 142 may read values from sensor matrix 112 in a manner so as to generate image data having a second orientation if the second orientation is different from a first orientation (e.g., the current orientation) of camera 110. In another example, image generation module 142 may read values from sensor matrix 112 in a first manner if the second orientation is the same as the first orientation and in a second manner if the second orientation is different from the first orientation.

Controller 140 may include a processor and a memory for implementing image generation module 142. The processor may include at least one central processing unit (CPU), at least one semiconductor-based microprocessor, at least one digital signal processor (DSP) such as a digital image processing unit, other hardware devices or processing elements suitable to retrieve and execute instructions stored in memory, or combinations thereof. The processor can include single or multiple cores on a chip, multiple cores across multiple chips, multiple cores across multiple devices, or combinations thereof. The processor may fetch, decode, and execute instructions from memory to perform various functions, such as generating, processing, and transmitting image data. As an alternative or in addition to retrieving and executing instructions, the processor may include at least one integrated circuit (IC), other control logic, other electronic circuits, or combinations thereof that include, a number of electronic components for performing various tasks or functions.

Controller 140 may include memory, such as a machine-readable storage medium. The machine-readable storage medium may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium can be computer-readable and non-transitory.

Although not illustrated, computing device 100 may also include a display. A display may be any of various display screens. For example, the display may be a display integrated into computing device 100, such as in the case of smart phones and tablet computers. The display may also be a display remotely connected to computing device 100. Furthermore, the display may be a touch sensitive display. The display may be used for various purposes, such as to display a user interface, to preview images to be captured by camera 110, and to conduct video calls with other devices.

Computing device 100 may include additional features as well, beyond those depicted in FIG. 1. In addition, other devices that may communicate with computing device 100, such as in a video call, may have some or all of these features described with respect to computing device 100.

In an embodiment, camera 110 may sense an image. For example, a user may be positioned in front of camera 110 and camera 110 can capture the user's image using sensor matrix 112. Camera 110 may sense the image in response to a command from the user. Alternatively, the user may be engaged in a video call with another device, and thus camera 110 may sense the image automatically as part of a video stream to be sent to the other device.

Orientation determiner 120 may determine a first orientation of camera 110. The first orientation may be a current orientation of camera 110. The determined orientation of the camera can be used to imply the inherent orientation of an image sensed by camera 110.

Figure 2:
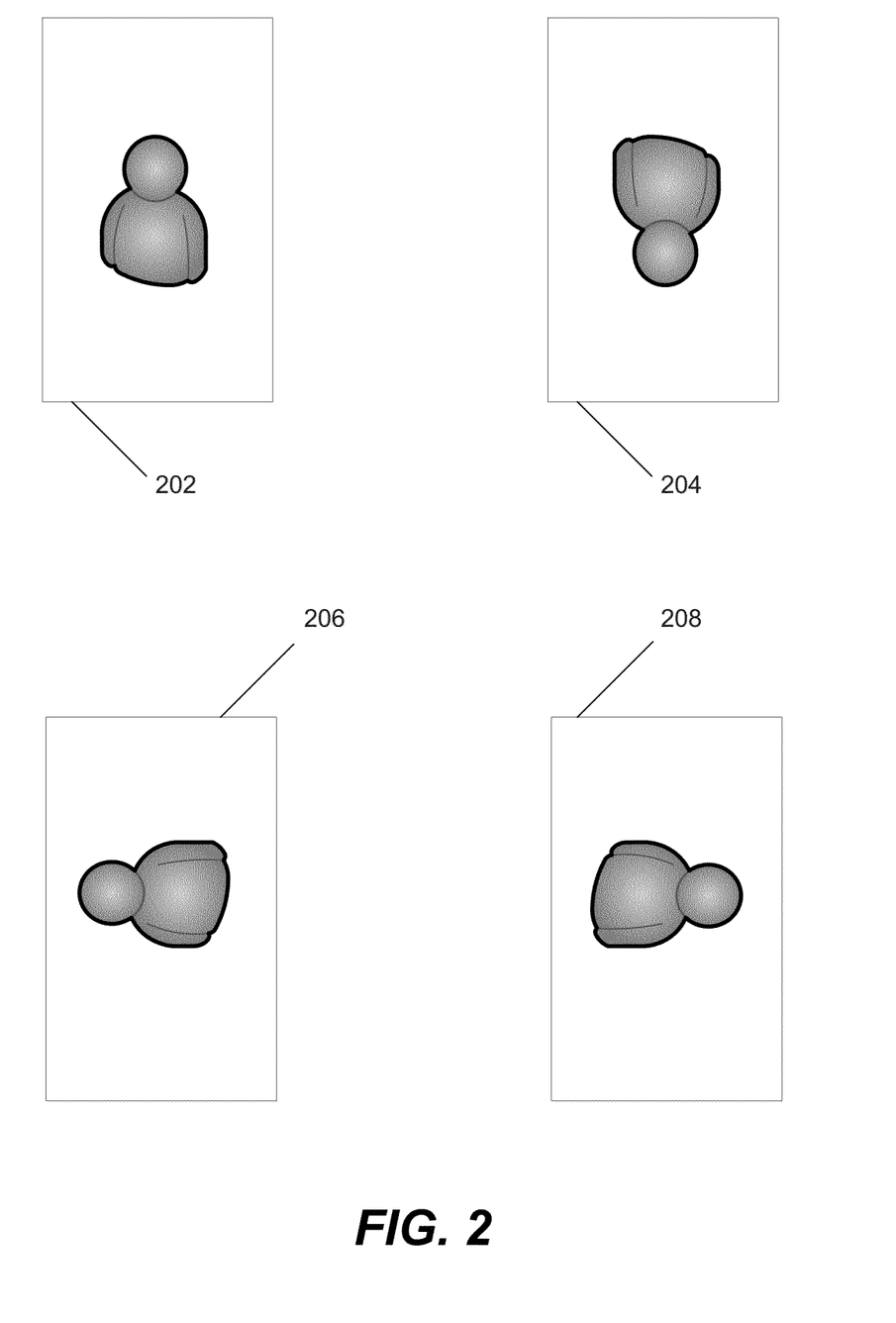
FIG. 2 is a depiction of different orientations of an image, according to an example.

The orientation of the camera may be represented in various ways. For example, as shown in FIG. 2, the orientation may be determined to be portrait-up 202, portrait-down 204, landscape-right 206, or landscape-left 208. The representations of these different orientations are depicted in FIG. 2 as they would appear if displayed on a display screen that is in portrait-up orientation. In one example, the portrait-up orientation may correspond to an up-right orientation of a smart phone in which the camera is positioned at the top of the device. As can be seen, only an image with a portrait-up orientation will be properly oriented in this example when displayed on a smart phone in portrait-up orientation, unless some kind of intervention is performed, such as re-orienting the image.

Each orientation may be considered different and distinct from the others. Thus, for example, portrait-up orientation may be considered different from portrait-down orientation. Alternatively, the landscape-right and landscape-left distinction may be maintained and the portrait-up and portrait-down distinction may be ignored, since it may be a rare occurrence that a user may turn his phone upside down during a video call. In another example, however, the up, down, left, and right distinction may be ignored and the determination may be made simply based on the portrait or landscape information. However, using only two orientations—portrait and landscape—may result in a less ideal user experience since the displayed image may end up being upside down. Nevertheless, for ease of explanation the examples below will be described with reference to just portrait and landscape orientations.

In addition, each distinct orientation may include a range of degrees that correspond to the particular orientation. For instance, in the case of four distinct orientations (e.g., portrait-up, portrait-down, landscape-left, and landscape-right), a range of 90 degrees may correspond to each orientation. Other range delineations may be used as well. Also, the orientations may be adapted to a particular type of display or camera sensor size. For example, a square display may not technically have a landscape and a portrait orientation since the aspect ratio would be the same for both. Nevertheless, the orientation of the display may be represented by assigning an up, down, left, and right orientation.

Communication interface 130 may receive a second orientation from another computing device. For example, the other computing device may be a device with which computing device 100 is communicating via a video call, as described above.

The second orientation received from the other computing device may simply be a default orientation. Alternatively, the second orientation may correspond to a current orientation of the other computing device. The second orientation may be decided upon in other manners as well.

In addition, there may be an aspect ratio associated with the second orientation. For instance, if the second orientation is portrait, the associated aspect ratio may be an aspect ratio that is displayable on the other computing device in portrait orientation. For example, the associated aspect ratio may be the ratio of the width of the display area to the height of the display area when the display of the other device is in portrait orientation. Similarly, if the second orientation is landscape, the associated aspect ratio may be the ratio of the width of the display area to the height of the display area when the display is in landscape orientation. The width and height may be measured in units, such as the number of pixels along each dimension. In one example, an aspect ratio associated with landscape orientation of a display can be 16:9, while an aspect ratio associated with portrait orientation of the same display can be 9:16.

The first orientation of camera 110, as determined by orientation determiner 120, may be compared to the second orientation received from the other device. This comparison can be performed by controller 140.

Image generation module 142 of controller 140 may read values from the sensor matrix in a manner so as to generate image data having the second orientation if the second orientation is different from the first orientation. Accordingly, for example, if the first orientation of camera 110 is landscape and the second orientation is portrait, then the controller may read values from the sensor elements in sensor matrix 112 such that the resulting image data represents an image having portrait orientation. Additionally, the resulting image may have the appropriate aspect ratio as well (i.e., the aspect ratio associated with the second orientation). In the above example, the aspect ratio associated with portrait orientation is 9:16 (instead of 16:9 for landscape orientation).

Accordingly, image generation module 142 may generate image data having the appropriate orientation, as opposed to modifying already generated image data (e.g., image data that is stored in memory) to achieve the appropriate orientation. Example processing related to image generation module 142 is described in further detail below.

Communication interface 130 may then transmit the generated image data to the other computing device. As a result, the other computing device may receive image data that is already in the second orientation and associated aspect ratio despite camera 110 of computing device 100 having been in a different orientation.

Figure 3:
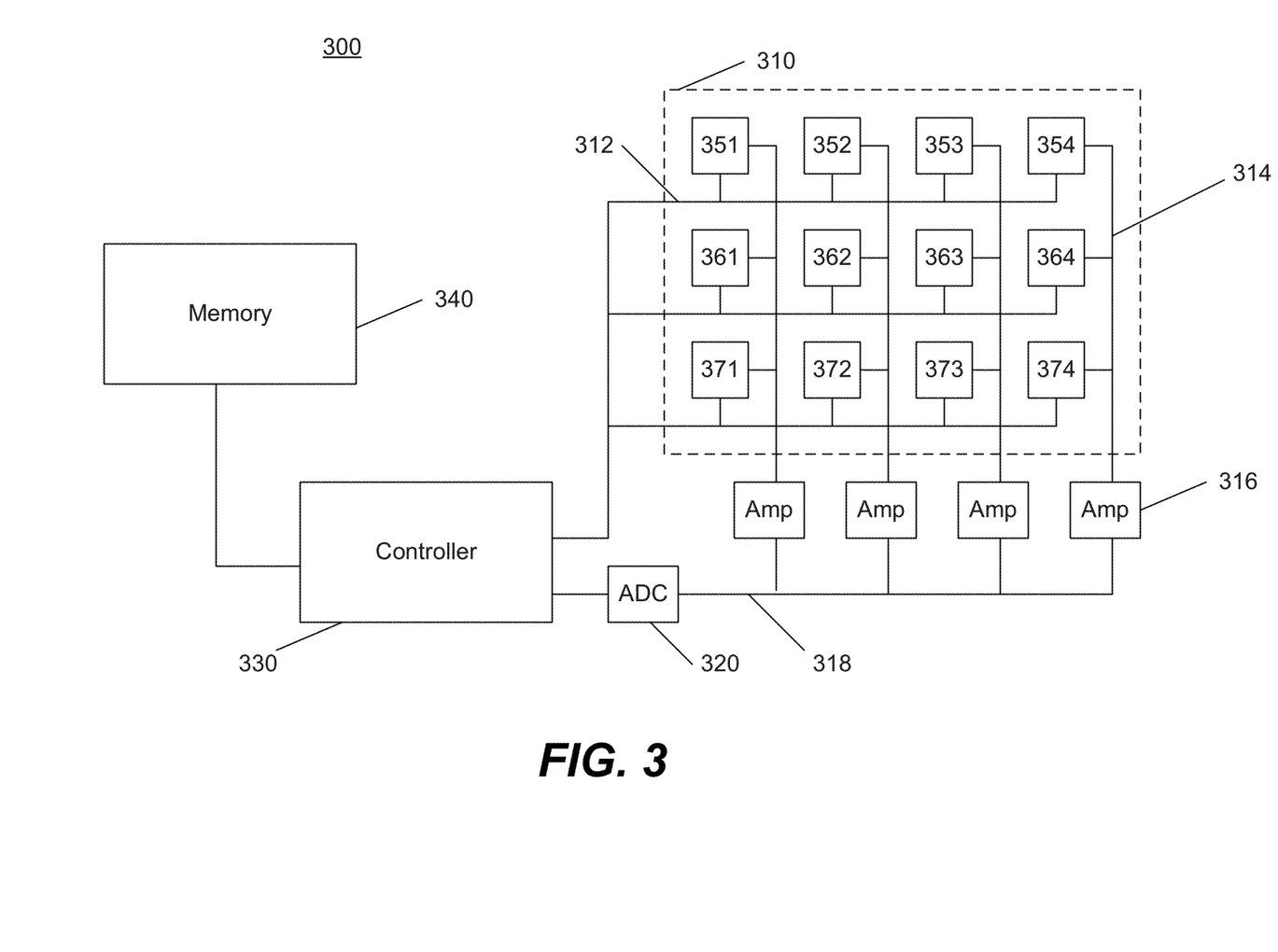
FIG. 3 is a depiction of a sensor matrix, a controller, and a memory, according to an example.

FIG. 3 illustrates a configuration 300 including a sensor matrix 310, a controller 330, and a memory 340, according to an illustrative example. Configuration 300 may be implemented in computing device 100. For instance, sensor matrix 310 may correspond to sensor matrix 112 and controller 330 may correspond to controller 140. Additionally, the processing described below may be implemented by image generation module 142.

Sensor matrix 310 is a simplified example of a passive-pixel sensor matrix. A passive-pixel sensor matrix is a sensor configuration in which each row of pixels shares an access enable wire and each column of pixels shares an amplifier. In contrast, an active-pixel sensor matrix is a sensor configuration in which each pixel has its own amplifier. In some embodiments, an active-pixel sensor matrix may be used.

Sensor matrix 310 can include multiple sensor elements 351-354, 361-364, 371-374. In this simplified example, there are 12 sensor elements. Of course, a camera may include hundreds of thousands or millions of sensor elements in a sensor matrix. Each row of sensor elements can be connected to an access enable line 312 controlled by controller 330. Although not shown, a multiplexer or the like may be used to control which row of sensor elements is enabled by controller 330. Each column of sensor elements can be connected to an output line 314 which can be connected to an amplifier 316.

When light shines on a sensor element, such as sensor element 354, during exposure of the sensor matrix, the light is converted into an electric charge which can be retained by a capacitor inside the sensor element. This electrical charge can represent the value of a pixel in an image sensed by the sensor matrix. Controller 330 can cause this electrical charge to be read from sensor element 354 by asserting access enable line 312. The electrical charge stored in sensor element 354 can be transmitted to amplifier 316 where the electrical charge can be amplified. The electrical charge can then be transmitted to an analog-to-digital converter (ADC) 320 via output line 318. ADC 320 can be an electronic device that converts an input analog voltage or current to a digital number proportional to the magnitude of the voltage or current. Accordingly, the electrical charge can be digitized by ADC and transmitted to controller 330.

Controller 330 may then store the digital signal in memory 340. Controller 330 may store the values from the sensor elements according to a particular convention. Controller 330 may implement a default convention. The default convention may correspond to a typical orientation of sensor matrix 310. For instance, if sensor matrix 310 is implemented in computing device 100, and the typical orientation of computing device 100 results in sensor elements 354, 364, and 374 being on top and sensor elements 351, 361, and 371 being on bottom, then the typical orientation may be considered to be a portrait orientation. The default convention may then account for this typical orientation.

The default convention may associate each particular sensor element with a certain location in an image. For instance, if the most common orientation of sensor matrix 310 is assumed to be portrait, controller 330 may store the values from the sensor elements in memory as if the represented image is in portrait orientation. For example, controller 330 may associate the value from sensor element 354 with a top left corner pixel of the image, the value from sensor element 375 with a top right corner pixel of the image, the value from sensor element 351 with a bottom left corner pixel of the image, and the value from sensor element 371 with a bottom right corner pixel of the image. When the image data is then read from memory 340 for transmission to another device, it may be interpreted according to the default convention and transmitted to the other device in portrait orientation.

When the orientation of sensor matrix 310 changes, however, the sensed image may actually have a different orientation than portrait. For instance, if the orientation of sensor matrix 310 changes to landscape, then the sensed image may have a landscape orientation as well. When the image data is transmitted to the other device, it may be transmitted as if the underlying image is in portrait orientation even though the image is in landscape orientation. If the other device is not itself in landscape orientation, this can result in the image being displayed sideways on the other device, as depicted by image 206 or 208 in FIG. 2.

According to an embodiment, as described above, controller 330 can account for a change in orientation of sensor matrix 310. Since a second orientation may be received from the other device via communication interface 130, a first orientation (e.g., the current orientation) of sensor matrix 310 may be compared with the second orientation (which is the orientation expected by the other device). If the first orientation of sensor matrix 310 is the same as the second orientation, controller 330 can operate according to the default convention. On the other hand, if the first orientation of sensor matrix 310 differs from the second orientation, controller 330 may read values from the sensor matrix in a manner so as to generate image data having the second orientation. Controller 330 may change the manner of reading values from the sensor matrix in several ways, as described below. A combination of these ways may also be employed.

Controller 330 may change an order in which the sensor matrix is scanned. For example, instead of asserting access enable line 312 first and moving down the rows until the bottom row ("bottom" is used relative to the orientation of FIG. 3), controller 330 may first assert the bottom access enable line and then end at access enable line 312. In addition, if sensor matrix 310 were an active-pixel sensor matrix, controller 330 could potentially change the column scan direction.

Controller 330 may change how a location of each sensor element of the sensor matrix is represented. For example, when transferring values from the sensor elements into memory 340, controller 330 could assign a different location to each sensor element so as to construct a correctly oriented image. For instance, where the default convention was to assign the value from sensor element 354 as the top left pixel, controller 330 may instead assign the value from sensor element 351 as the top left pixel. Similarly, the value from sensor element 371 could be assigned as the bottom left pixel, and so on.

Figure 4:
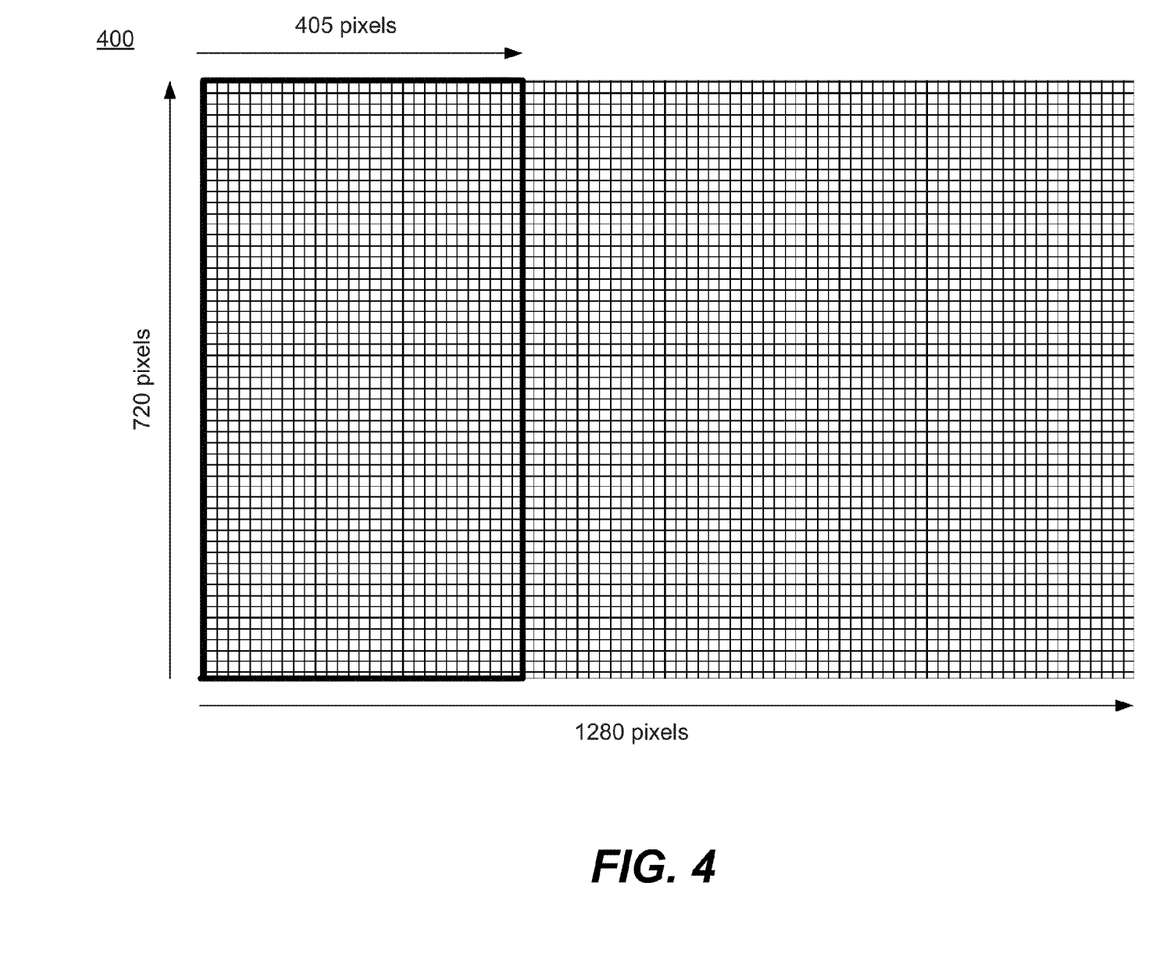
FIG. 4 is a depiction of a sensor matrix, according to an example.

Controller 330 may read values from only a subset of sensor elements of the sensor matrix. Since portrait orientation and landscape orientation generally have different aspect ratios, controller 330 may read fewer values than normal in order to construct an image having the correct aspect ratio. For example, FIG. 4 illustrates a 1280×720 sensor matrix 400 including multiple sensor elements. This represents a 16:9 aspect ratio in landscape orientation and a 9:16 aspect ratio in portrait orientation. As can be seen, the current orientation of sensor matrix 400 is landscape. If, however, the second orientation is portrait, some sensor elements may be ignored in order to generate image data in portrait orientation with the appropriate aspect ratio. Accordingly, image data in portrait orientation with a 9:16 aspect ratio may be generated by reading values from a subset of sensor elements, as indicated by the bolded rectangle. Although this results in an image having a smaller resolution (i.e., 720×405) than sensor matrix 400 is capable of generating, the orientation and aspect ratio are correct. Because of the smaller resolution, the image data may be stored in memory 340 in a manner that accounts for the smaller resolution. For example, memory 340 may have a designated location for storing the resolution/size of the image data so that it can be read from memory properly. Similarly, the resolution/size of the image data may also be transmitted to the other device so that the image data can be properly interpreted.

Figure 5:
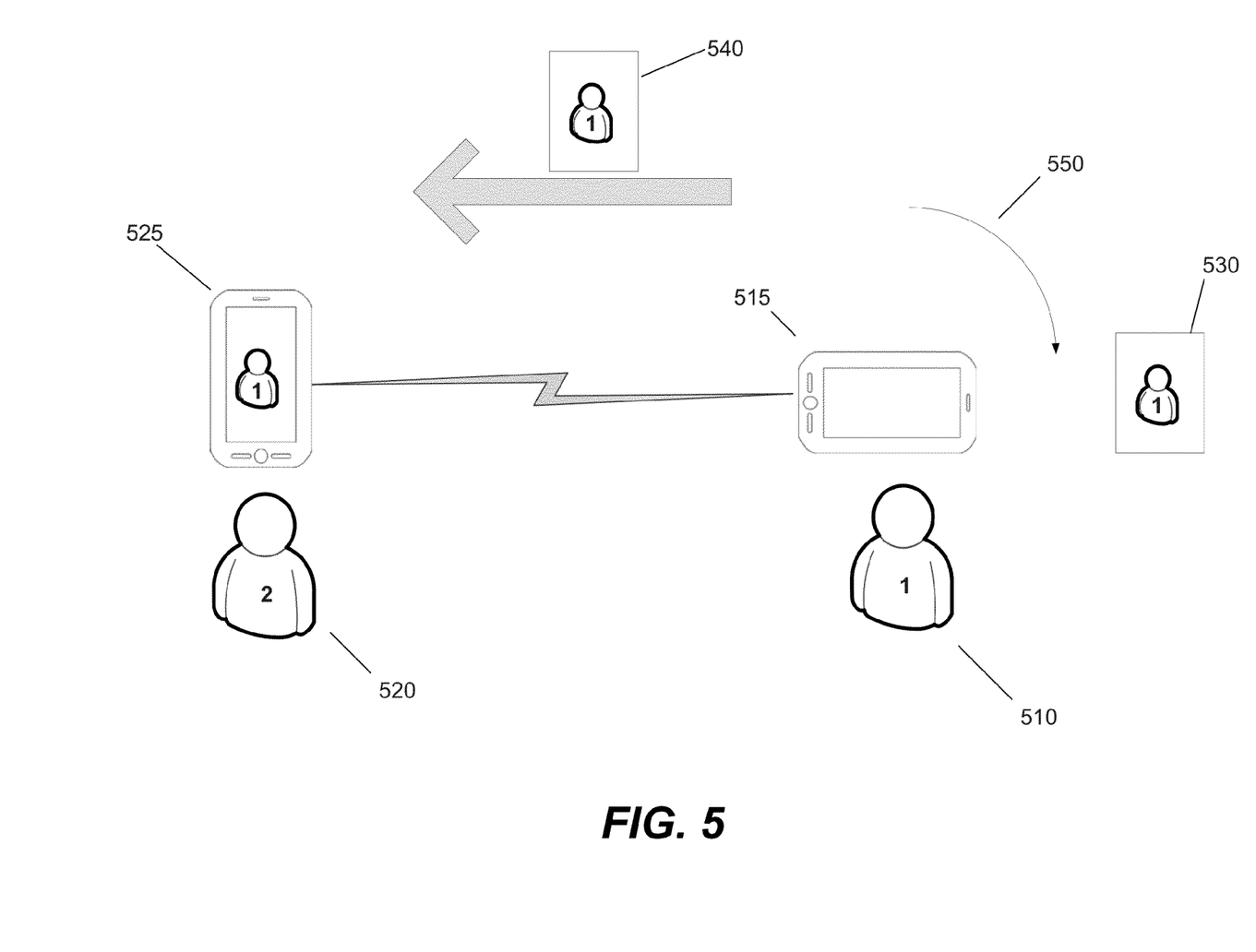
FIG. 5 is a depiction of a sample use case relating to devices and methods disclosed herein, according to an example.

FIG. 5 illustrates a sample use case according to an example. Users 510 and 520 are engaged in a video call using smart phones 515 and 525. The video call may be conducted and the image data transferred according to various standards and technologies such as Session Initiation Protocol (SIP), Real-time Transport Protocol (RTP), Secure Real-time Transport Protocol (SRTP), H.264, H.323, and the like.

FIG. 5 depicts the processing of a sensed image from the perspective of smart phone 515, which can be considered the sending device. In addition, it is assumed that at the beginning of the call both smart phones were in portrait orientation and agreed to set portrait orientation as an expected orientation for transferred image data.

An expected orientation may be an orientation that a receiving device expects to receive from a sending device. For example, the receiving device may be configured to process any received image data as if it is in the expected orientation. In other words, the receiving device may assume that any received image data is in the expected orientation. Additionally, an expected orientation may be an orientation that a sending device assumes that the receiving device is configured to receive (e.g., when the expected orientation is set as a default without explicit acknowledgement by the receiving device).

In one example, the expected orientation can be agreed upon based upon one of the devices sending portrait orientation as a suggested orientation to the other device. Accordingly, based on the set expected orientation, image data sent from smart phone 515 to 525 may be interpreted by smart phone 525 as in portrait orientation. In addition, an aspect ratio associated with the expected orientation may be set. In the case of an expected orientation of portrait, the associated aspect ratio may be, for example, 9:16. This aspect ratio may have been selected for a variety of reasons, such as because it is the aspect ratio of the display of smart phone 525 when it is in portrait orientation, for example. The expected orientation and associated aspect ratio may be determined in other ways, as well. For instance, the expected orientation and associated aspect ratio may be default values hard-coded into a computer program used by one or both smart phones. Of course, in such a case, it could be possible for the smart phones to later agree to a different orientation and aspect ratio.

As illustrated by arrow 550, however, user 510 has rotated his smart phone 515 to landscape orientation. As a result, the camera on smart phone 515 is now also in landscape orientation. Accordingly, without intervention, an image captured by smart phone 515 would be transmitted to smart phone 525 and interpreted by smart phone 525 in portrait orientation. As a result, as depicted in FIG. 2 by images 206 and 208, the image of user 510 would be sideways. This could result in a poor video call experience for user 520.

According to this example, however, the orientation of smart phone 515's camera may be detected by smart phone 515. In particular, smart phone 515 may determine that the camera is in landscape orientation. Smart phone 515 may generate image data so that the underlying image 530 is correctly oriented (portrait) and has the correct aspect ratio (e.g., 9:16). Examples of these image generation processes were explained above with reference to FIGS. 1-4.

The generated image data may be transmitted to smart phone 525 as image 540. As can be seen, the image of user 510 is correctly oriented and the aspect ratio corresponds to portrait orientation. Consequently, smart phone 525 may display image 540 without having to detect and change the orientation even though the image sensed by smart phone 515's camera was in a different orientation.

Figure 6:
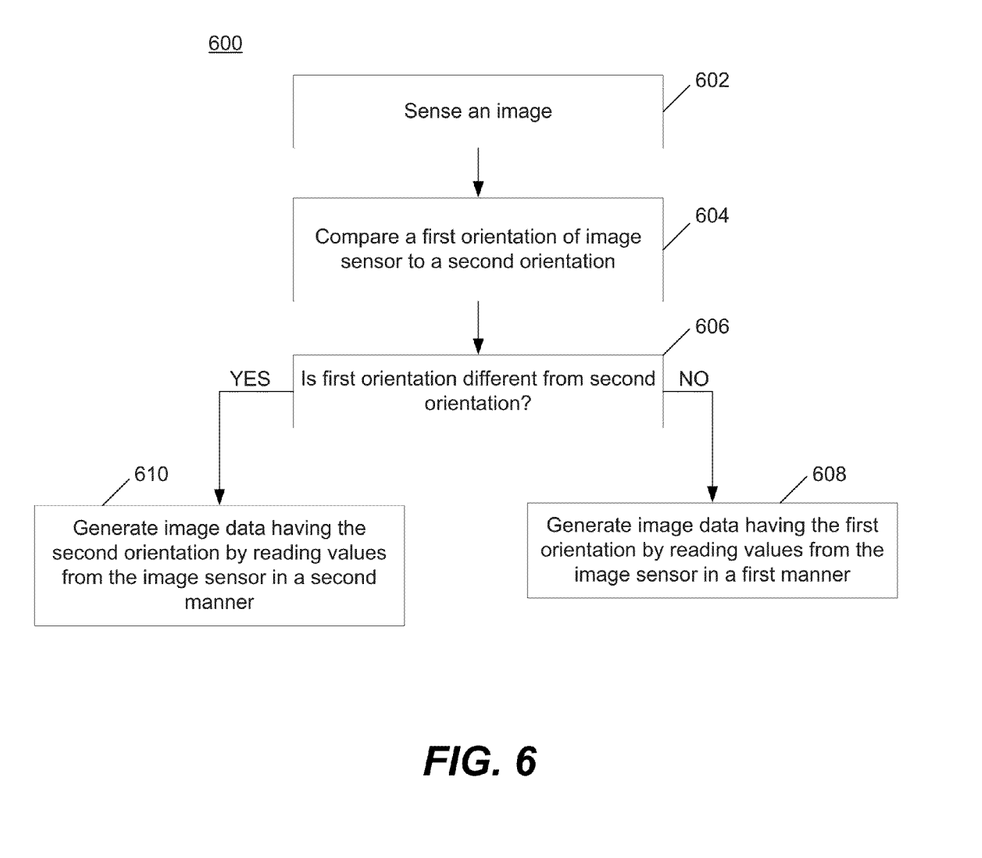
FIG. 6 is a flowchart illustrating aspects of a method for sensing an image, according to an example.

FIG. 6 is a flowchart illustrating aspects of a method 600 executed by a computing device for sensing an image and generating image data, according to an example. Although execution of method 600 is described below with reference to the components of computing device 100, other suitable components for execution of method 600 can be used. Method 600 may be implemented in the form of executable instructions stored on a machine-readable medium or in the form of electronic circuitry. A processor, a machine-readable storage medium, other control logic, or a combination thereof can be used to execute method 600.

Method 600 may start at 602 where an image may be sensed. For example, computing device 100 may sense an image using an image sensor, such as camera 110. Method 600 may proceed to 604 where a first orientation (e.g., the current orientation) of the image sensor may be compared to a second orientation. Computing device 100 may determine the orientation of the image sensor using orientation determiner 120. For example, an orientation sensor such as an accelerometer may be used to determine the orientation of computing device 100 or camera 110. Alternatively or additionally, object recognition techniques may be used to detect an object (e.g., a face) in the image. The orientation of the object may be determined and used as a proxy for the orientation of the image and, thus, of the image sensor. The second orientation may be a default orientation or an orientation received from another device, for example.

At 606, if the first orientation of the image sensor is the same as (i.e., not different from) the second orientation (NO at 606), method 600 may proceed to 608 where values can be read from the image sensor in a first manner so as to generate image data having the first orientation.

The orientations may be considered the same if they have the same orientation value. For instance, if portrait and landscape are the only two possible orientations, then the first orientation may be considered to be the same as the second orientation if they are both portrait or both landscape.

The first manner may correspond to a default method of processing employed by controller 140. For example, an example of a default method that can correspond to the first manner was described with respect to FIG. 3, where a first scan direction and a default convention for representing/storing image data were used.

If the first orientation of the image sensor differs from the second orientation (YES at 606), method 600 may proceed to 610 where values can be read from the image sensor in a second manner so as to generate image data having the second orientation.

The orientations may be considered different if they have different orientation values. For instance, if portrait and landscape are the only two possible orientations, then the first orientation may be considered to differ from the second orientation if the first orientation is portrait and the second orientation is landscape, or vice versa.

The second manner of reading may differ from the first manner. For example, the second manner of reading may include changing a scan direction of the image sensor, reading fewer values than would be read according to the first manner of reading, or changing a manner in which locations of sensor elements of the image sensor are represented. These techniques are described above in more detail with respect to FIG. 3.

Figure 7:
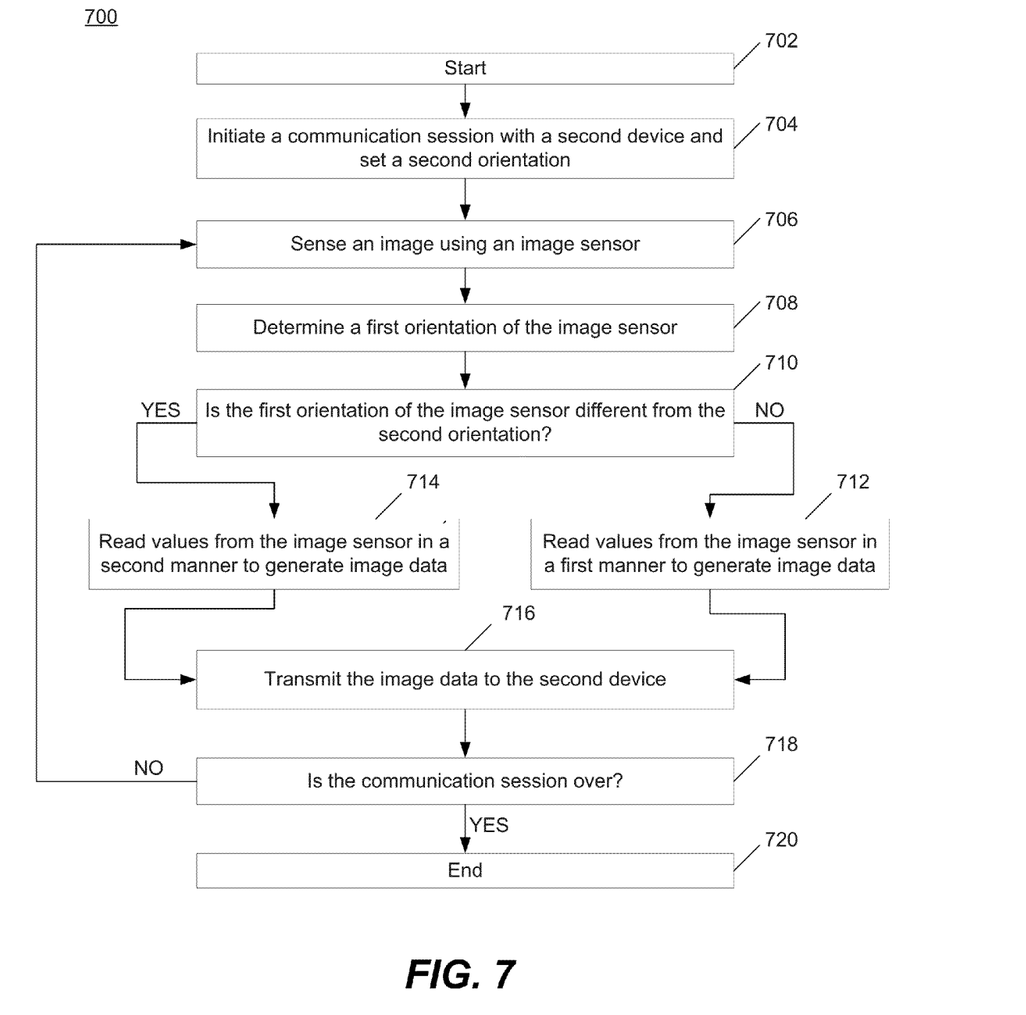
FIG. 7 is a flowchart illustrating aspects of a method for conducting a communication session with another device, according to an example.

FIG. 7 is a flowchart illustrating aspects of a method 700 executed by a computing device for conducting a communication session with another device, according to an example. Although execution of method 700 is described below with reference to the components of computing device 100, other suitable components for execution of method 700 can be used. Method 700 may be implemented in the form of executable instructions stored on a machine-readable medium or in the form of electronic circuitry. A processor, a machine-readable storage medium, other control logic, or a combination thereof can be used to execute method 700.

Method 700 may start at 702 and proceed to 704 where a communication session may be initiated with another device. For example, computing device 100 may request a video call with another device. The video call may be conducted and the image data transferred according to various standards and technologies such as Session Initiation Protocol (SIP), Real-time Transport Protocol (RTP), Secure Real-time Transport Protocol (SRTP), H.264, H.323, and the like.

During set-up of the video call, an orientation may be set as a second orientation. For example, computing device 100 may set the second orientation by storing it in memory. In an embodiment, a default orientation may be set as the second orientation, such that any image transmitted during the call will be assumed to have the default orientation. In some cases, an associated aspect ratio may be explicitly specified or implied. For example, the aspect ratio to be used may correspond to an aspect ratio associated with the image sensor of camera 110 when camera 110 is in the second orientation. Alternatively, the aspect ratio may correspond to a display size or aspect ratio of the computing device 100 or of the other device when in the second orientation.

Furthermore, the second orientation and/or aspect ratio may not need to be specified between the devices. This may be the case if both devices are running the same computer program, or perhaps if both devices are the same model. For example, the program may have a hard-coded default orientation which may be used. In another example, the orientation and aspect ratio may be communicated and agreed upon between the two devices. For example, computing device 100, which initiated the call, may select the orientation based on its current orientation and communicate the selected orientation to the other device. Alternatively, the other device, which received the request for a call, may select the orientation based on its current orientation and communicate the selected orientation to computing device 100. Additionally, as described above, a corresponding aspect ratio may not need to be communicated between the two devices, though it may be in some cases.

At 706, an image may be sensed using an image sensor. For example, computing device 100 may sense an image using camera 110. At 708, a first orientation (e.g., the current orientation) of the image sensor can be determined. At 710, it can be determined whether the first orientation is different from the second orientation. If the orientations are not different (NO at 710), the method may proceed to 712, where image data may be generated by reading values from the image sensor according to a first manner. If the orientations are different (YES at 710), the method may proceed to 714, where image data may be generated by reading values from the image sensor according to a second manner different from the first manner. In either case, method 700 may proceed to 716 where the generated image data may be transmitted to the other device. For example, computing device 100 may transmit the image to the other device using communication interlace 130. The method may then proceed to 718, where it can be determined whether the communication session is over. If the communication session is not over (NO at 718), the method may proceed to 706 to continue the process. If the communication session is over (YES at 718), the method may proceed to 720, where the process may terminate.

Figure 8:
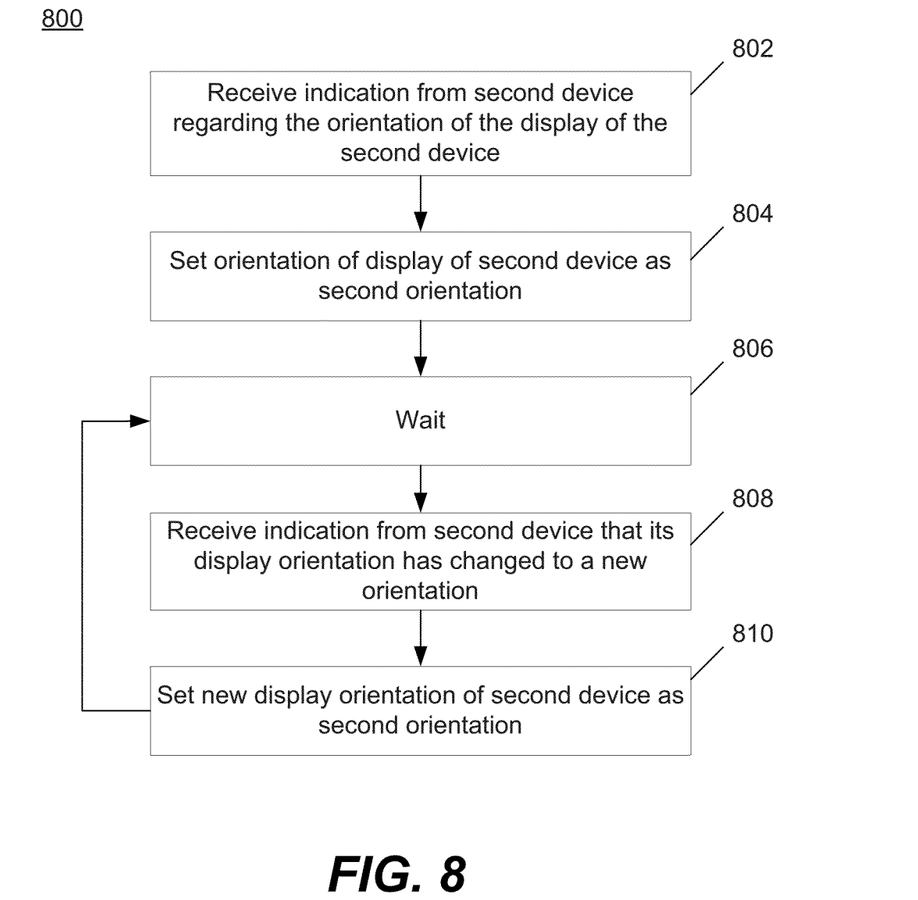
FIG. 8 is a flowchart illustrating aspects of a method for setting and updating an orientation received from another device, according to an example.

In some embodiments the second orientation and associated aspect ratio may be changed during the communication session. For example, if the orientation of the other device changes during the communication session, it may be beneficial for the other device to communicate this to computing device 100 so that properly oriented and sized images may be transmitted to the other device. FIG. 8 is a flowchart illustrating aspects of a method 800 executed by computing device 100 for setting and updating an orientation received from another device. Although execution of method 800 is described below with reference to the components of computing device 100, other suitable components for execution of method 800 can be used. Method 800 may be implemented in the form of executable instructions stored on a machine-readable medium or in the form of electronic circuitry. A processor, a machine-readable storage medium, other control logic, or a combination thereof can be used to execute method 800.

Method 800 may start at 802 where an indication is received from a second device regarding the orientation of the display of the second device. For example, computing device 100 may receive this indication using communication interface 130. In addition, an indication may also be received regarding the associated aspect ratio, although computing device 100 may be capable of determining the associated aspect ratio without such an indication. At 804, the orientation of the display of the second device may be set as the second orientation. Additionally, the aspect ratio may be set as well. The processing of 804 may correspond to the processing of 704 in FIG. 7, for example.

At 806, computing device 100 may wait. Waiting may be an active process of computing device 100. For example, a module responsible for setting the expected orientation and aspect ratio may remain active. Alternatively, waiting may be a passive process of computing device 100. For example, waiting may simply signify that computing device 100 is capable of receiving an update regarding the second device's orientation. In particular, upon receiving such an update, computing device 100 may call or activate a module responsible for updating the expected orientation and aspect ratio.

At 808, an indication may be received from the second device that the display orientation of the second device has changed to a new orientation. In addition, an indication may also be received regarding the aspect ratio associated with the display in the new orientation, although computing device 100 may be capable of determining the new aspect ratio without such an indication.

At 810, the new display orientation of the second device may be set as the expected orientation. Additionally, the new aspect ratio may also be set. The method may then proceed to 806, where computing device 100 may wait for a new update.

Figure 9:
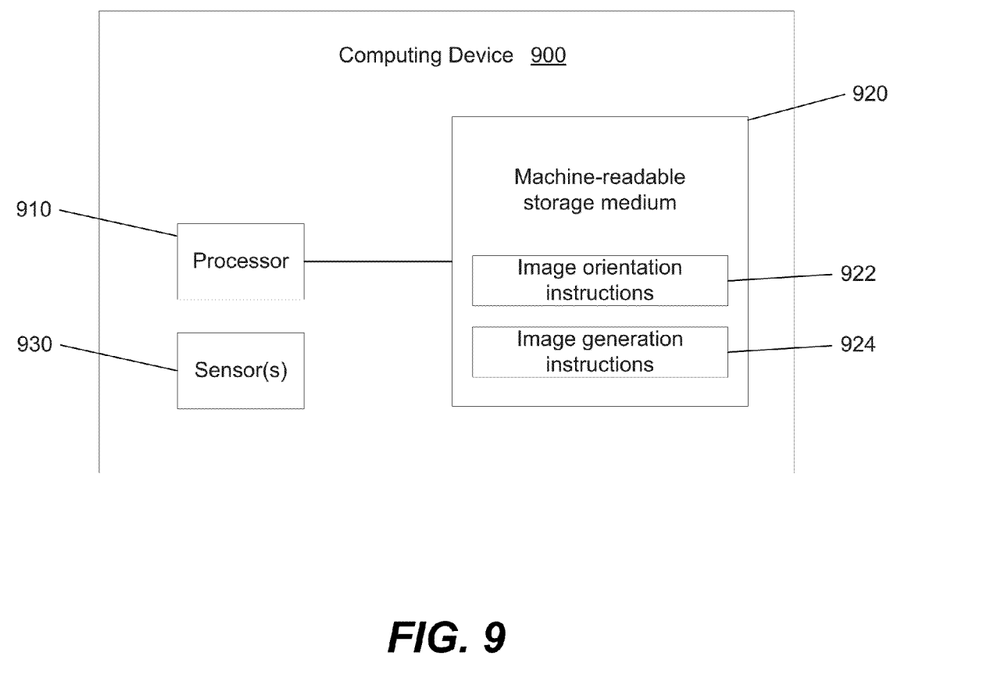
FIG. 9 is a block diagram illustrating a computing device including a machine-readable storage medium encoded with instructions to generate image data, according to an example.

FIG. 9 is a block diagram illustrating aspects of a computing device 900 including a machine-readable storage medium 920 encoded with instructions to generate image data, according to an example. Computing device 900 may be, for example, a communication device such as a cellular telephone, a smart phone, or a computer. The computer can be a tablet computer, a slate computer, a laptop computer, a desktop computer, or the like.

Processor 910 may be at least one central processing unit (CPU), at least one semiconductor-based microprocessor, at least one digital signal processor (DSP) such as a digital image processing unit, other hardware devices or processing elements suitable to retrieve and execute instructions stored in machine-readable storage medium 920, or combinations thereof. Processor 910 can include single or multiple cores on a chip, multiple cores across multiple chips, multiple cores across multiple devices, or combinations thereof. Processor 910 may fetch, decode, and execute instructions 922, 924 to implement image generation. As an alternative or in addition to retrieving and executing instructions, processor 910 may include at least one integrated circuit (IC), other control logic, other electronic circuits, or combinations thereof that include a number of electronic components for performing the functionality of instructions 922, 924. Accordingly, processor 910 may be implemented across multiple processing units and instructions 922, 924 may be implemented by different processing units in different areas of computing device 900.

Machine-readable storage medium 920 may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium 920 can be computer-readable and non-transitory. Machine-readable storage medium 920 may be encoded with a series of executable instructions for generating images.

The instructions 922, 924, when executed by processor 910 (e.g., via one processing element or multiple processing elements of the processor) can cause processor 910 to perform processes, for example, the processes depicted in FIGS. 6-8. Furthermore, computing device 900 may be similar to computing device 100 and may have similar functionality and be used in similar ways, as described above.

An image can be sensed by sensor(s) 930. Sensor(s) 930 may include an image sensor, a camera, or the like, as described above. Sensor(s) 930 may also include an orientation sensor, such as an accelerometer. Image orientation instructions 922 can cause processor 910 to determine an orientation of computing device 900. For example, image orientation instructions 922 may use sensor(s) 930 to determine the orientation based on a value from an accelerometer. Additionally or alternatively, image orientation instructions may determine the orientation of the image using object recognition techniques by determining the orientation of objects in the generated image itself.

Image orientation instructions 922 can also cause processor 910 to determine a second orientation associated with a second computing device. The second computing device could be a computing device with which computing device 100 is communicating. Determining the orientation associated with the second computing device could be accomplished, for example, by accessing a stored value in memory, such as machine-readable storage medium 910. Image generation instructions 924 can cause processor 910 to read values from the sensor(s) 930 in a manner so as to generate image data having the second orientation if the orientation of computing device 900 differs from the second orientation. Processor 910 may generate the image data according to one or more techniques as described above with reference to FIGS. 3 and 4.

In an example, the orientation of computing device 900 may have an associated aspect ratio different from an aspect ratio associated with the second orientation.

In an example, the sensor(s) 930 can include a matrix of sensor elements. The matrix can include a longer dimension and a shorter dimension, as depicted in FIG. 4, for example. Values can be read from the sensor in a manner so as to generate image data having the second orientation by reading only sensor elements that are within an area of the matrix defined by the shorter dimension and a portion of the longer dimension. The portion of the longer dimension can be determined based on the length of the shorter dimension the aspect ratio associated with the second orientation. For instance, referring to FIG. 4, if the second orientation is portrait and the associated aspect ratio is 9:16, the portion of the longer dimension can be determined by multiplying the length of the shorter dimension—720 pixels—by 9 and dividing the result by 16. Accordingly, the portion of the longer dimension can be determined to be 405 pixels.

What is claimed is:

1. A computing device comprising:
   a camera to generate image data;
   a communication interface configured to receive a display orientation and display aspect ratio from a second computing device; and
   a controller to modify an image orientation and an image aspect ratio of the image data to the display orientation and display aspect ratio received from the second computing device if determined that the image orientation is different from the display orientation,
   the communication interface further configured to transmit the modified image data to the second device.

2. The computing device of claim 1,
   wherein the image orientation is landscape and the display orientation is portrait,
   wherein the image aspect ratio is a ratio represented by a width of an image represented by the image data by a height of the image when the image is oriented according to the image orientation, and
   wherein the display aspect ratio is a ratio represented by a width of a display area of a display of the second computing device by a height of the display area when the display is oriented according to the display orientation.

3. The computing device of claim 1, wherein the controller is configured to determine the image orientation by applying object recognition techniques to determine an orientation of an object represented in the image data.

4. The computing device of claim 1, further comprising:
   an accelerometer to determine an orientation of the computing device,
   wherein the controller is configured to determine the image orientation of the image data using a value from the accelerometer.

5. The computing device of claim 1, wherein the computing device is a smart phone, a tablet computer, or a slate computer.

6. A method performed by a first device during a video call with a second device, the method comprising:
   sensing an image having a first orientation and a first size associated with the first orientation using an image sensor of the first device;
   determining a second orientation expected by the second device, the second orientation having an associated second size;
   modifying the image so that the image has the second orientation and the second size if the first orientation differs from the second orientation; and
   transmitting the modified image to the second device as part of a video stream associated with the video call.

7. The method of claim 6, wherein modifying the image so that the image has the second orientation and the second size comprises rotating the image.

8. The method of claim 7, wherein modifying the image so that the image has the second orientation and the second size further comprises at least one of scaling the image and cropping the image.

9. The method of claim 8,
   wherein the image comprises a depiction of a face, and
   wherein the at least one of scaling the image and cropping the image is performed such that the depiction of the face is retained in the modified image.

10. The method of claim 8, comprising:
    setting the second orientation expected by the second device at a beginning of the video call.

11. The method of claim 6, wherein the second orientation expected by the second device corresponds to an orientation of a display of the second device.

12. The method of claim 11, further comprising:
    receiving an indication from the second device that the orientation of the display of the second device has changed to a different orientation; and
    updating the second orientation expected by the second device to be the different orientation.

13. The method of claim 6, wherein the second size associated with the second orientation corresponds to dimensions of a display of the second device when the display of the second device is in the second orientation.

14. A non-transitory machine-readable storage medium encoded with instructions executable by a processor of a first communication device, the machine-readable medium comprising:
    instructions to generate an image using a sensor of the first communication device;
    instructions to determine a first orientation of the image;
    instructions to determine a second orientation associated with a second communication device;
    instructions to modify the image by rotating the image and changing the resolution of the rotated image if determined that the first orientation and the second orientation differ; and
    instructions to transmit the modified image to the second communication device.

15. The machine-readable medium of claim 14, wherein the instructions to change the resolution of the rotated image comprise at least one of scaling the rotated image and cropping the rotated image so that the rotated image has a resolution associated with the second orientation.

16. The machine-readable medium of claim 14, wherein the first orientation is landscape and the second orientation is portrait.

17. The machine-readable medium of claim 14, further comprising instructions to receive, using a communication interface of the first communication device, the second orientation associated with the second communication device.

18. The machine-readable medium of claim 14, further comprising instructions to determine a display aspect ratio of the second computing device.

19. The machine-readable medium of claim 18, further comprising instructions to receive, using a communication interface of the first communication device, the display aspect ratio of the second computing device.

20. The machine-readable medium of claim 14, further comprising instructions to determine the first orientation by applying object recognition techniques to determine an orientation of an object represented in the image.

* * * * *